E. W. KELLER.
FRAME FOR MOTOR CYCLES.
APPLICATION FILED DEC. 4, 1905.
946,758.
Patented Jan. 18, 1910.
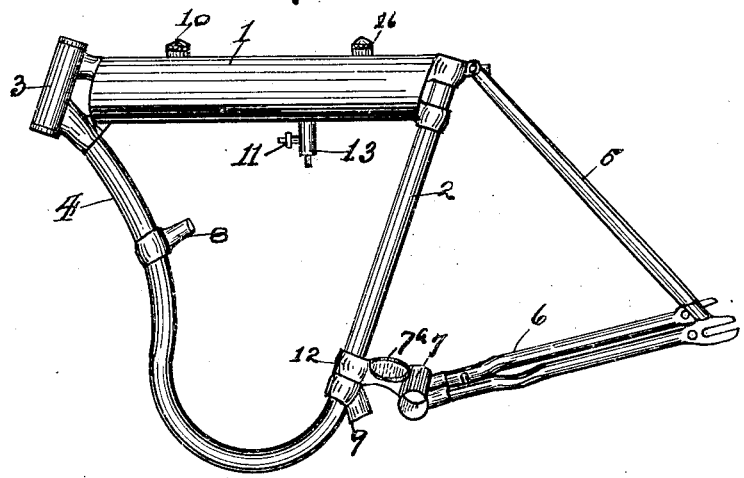
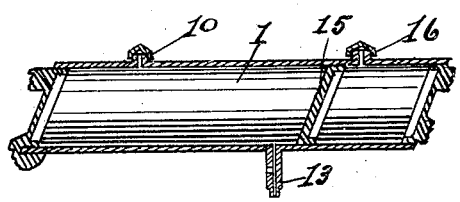

UNITED STATES PATENT OFFICE.

EDWIN W. KELLER, OF CHICAGO, ILLINOIS, ASSIGNOR TO ARMAC MOTOR COMPANY, OF CHICAGO, ILLINOIS, A CORPORATION OF ILLINOIS.

FRAME FOR MOTOR-CYCLES.

946,758.      Specification of Letters Patent.      Patented Jan. 18, 1910.

Application filed December 4, 1905. Serial No. 290,050.

*To all whom it may concern:*

Be it known that I, EDWIN W. KELLER, a citizen of the United States, residing at Chicago, in the county of Cook and State of Illinois, have invented a certain new and useful Improvement in Frames for Motor-Cycles, of which the following is a specification.

One of the greatest difficulties in motor cycle construction is the inability to secure the gasolene or oil tank fixedly to the frame in such a manner that it will not jar loose or take up more room than can be provided.

My invention has for its object to provide a new and useful gasolene and oil tank which is to form an integral part of the motor cycle frame, and, therefore, utterly avoids both of the above objections, and has the added desirable feature of avoiding the expense of a copper gasolene tank.

My method of accomplishing the foregoing may be more readily understood by having reference to the accompanying drawings, which are a part of this specification and are hereunto annexed, in which—

Figure 1 is a side view of my improved frame. Fig. 2 is a sectional view of the gasolene and oil tank.

Similar characters refer to similar parts throughout the entire description.

In the drawings, 1 is a gasolene tank which forms the top bar of the frame, this frame being constructed with a seat-post bar 2, a head 3, a lower bar 4, the lower bar and seat post bar being formed of a single continuous piece of tubing, rear stays and rear forks 5 and 6 respectively, a crank hanger 7 being located at the inner end of the rear fork 6, having a member terminating in a lug 12 which extends forward and around the seat post 2 and is brazed thereto. The said member projecting between the crank hanger 7 and seat post bar has provided on its upper surface a seat 7ª, for any desired purpose the said seat conveniently constituting a suitable mounting for the batteries of the motor. A lug 8 is mounted upon the lower bar 4 and is in communication with the interior of the tube forming the said lower bar. A similar lug 9 but of larger diameter is located immediately below the lug 12 upon the seat post bar 4 and is also in communication with the interior of the tube 4; the lug 8 being provided to engage the exhaust pipe of the motor, the lug 9 permitting the escape of said exhaust into the atmosphere. The gasolene tank 1 takes the place of the top bar of the frame and is attached thereto by means of my special fittings which are brazed thereto, thus forming an integral part of the frame itself. The said tank has a wall or partition 15 located therein forming a separate compartment in which to carry lubricating oil, the other and larger compartment being adapted to carry the fuel supply. Lugs 10 and 16 are provided on which to mount caps through which to fill the compartments of the tank 1. A pet cock 11 may be located at the bottom of said tube if desired, it generally being located upon the nipple 13 which is provided to carry the gasolene to the engine.

Having described my invention, what I regard as new and desire to secure by Letters Patent is—

1. In a motor cycle frame, the combination of a substantially U-shaped tubular frame member of integral construction, one arm constituting a forward bar and the other a seat post bar, an enlarged tubular member constituting the upper bar of the frame and projecting between the forward and seat post bars, means at the respective ends of the enlarged frame for connecting the latter directly to the upper ends of the forward and seat post bars, the enlarged tubular member constituting a receptacle adapted to contain gasolene or the like and having an inlet opening in its upper surface and an outlet tip in its lower surface adapted to supply a motor, a pipe communicating with the forward tubular bar and connected thereto for receiving the exhaust of the motor, and an auxiliary pipe communicating with the seat post bar for permitting the escape of the exhaust.

2. In a motor cycle frame the combination of a substantially U-shaped tubular frame member of integral construction one arm constituting a forward bar and the other a seat post bar, an enlarged tubular member constituting the upper bar of the frame and projecting between the forward and seat post bars means at the respective ends of the enlarged frame for connecting the latter directly to the upper ends of the forward and seat post bars, the enlarged tubular member forming a receptacle adapted to contain fuel for a motor and having an inlet opening in its upper surface and an outlet opening in its lower surface adapted to supply the motor, an inlet connection on the forward tubular bar constructed and arranged to receive the exhaust of the motor an outlet connection on the seat post bar adjacent the lower end of the latter and exposed downwardly for permitting the escape of the exhaust, rear stays projecting downwardly and rearwardly from the upper end of the seat post bars, rear forks having means at their rear ends for connection with said stays, the forks terminating in a crank hanger at their forward ends, a member extending between the crank hanger and rear post seat and connecting with the latter at a point above the exhaust outlet, and the said member having a seat on the upper surface thereof.

EDWIN W. KELLER.

Witnesses:
J. H. CARROLL,
C. M. BURNAM.